(12) United States Patent
Shim et al.

(10) Patent No.: US 10,774,010 B2
(45) Date of Patent: Sep. 15, 2020

(54) FORMING A SURFACE LAYER ON A CERAMIC MATRIX COMPOSITE ARTICLE

(71) Applicant: Rolls-Royce High Temperature Composites, Inc., Cypress, CA (US)

(72) Inventors: Sungbo Shim, Irvine, CA (US); Andrew Joseph Lazur, Laguna Beach, CA (US); Robert Shinavski, Mission Viejo, CA (US)

(73) Assignee: Rolls-Royce High Temperature Composites, Inc., Cypress, CA (US)

( * ) Notice: Subject to any disclaimer, the term of this patent is extended or adjusted under 35 U.S.C. 154(b) by 340 days.

(21) Appl. No.: 15/499,946

(22) Filed: Apr. 28, 2017

(65) Prior Publication Data

US 2017/0313629 A1  Nov. 2, 2017

Related U.S. Application Data

(60) Provisional application No. 62/330,575, filed on May 2, 2016.

(51) Int. Cl.
  *C04B 41/00* (2006.01)
  *C04B 41/89* (2006.01)
  (Continued)

(52) U.S. Cl.
  CPC ............ *C04B 41/009* (2013.01); *C04B 35/80* (2013.01); *C04B 41/52* (2013.01); *C04B 41/89* (2013.01);
  (Continued)

(58) Field of Classification Search
  CPC ....... C04B 41/009; C04B 41/52; C04B 41/89; C04B 35/80; C04B 14/4693; C04B 30/02;
  (Continued)

(56) References Cited

U.S. PATENT DOCUMENTS

| 4,242,106 A | 12/1980 | Morelock |
| 5,840,221 A * | 11/1998 | Lau .................. B28B 1/265 |
| | | 264/29.7 |

(Continued)

FOREIGN PATENT DOCUMENTS

| DE | 102007063517 B3 | 1/2009 |
| EP | 1683771 A1 | 7/2006 |

(Continued)

OTHER PUBLICATIONS

Ceramic matrix composite. https://en.wikipedia.org/wiki/Ceramic_matrix_composite (accessed Oct. 25, 2019). (Year: 2019).*

(Continued)

*Primary Examiner* — William P Fletcher, III
(74) *Attorney, Agent, or Firm* — Shumaker & Sieffert, P.A.

(57) ABSTRACT

Techniques for infiltrating a CMC substrate may include infiltrating the CMC substrate with a first slurry to at least partially fill at least some inner spaces of the CMC substrate, where the first slurry includes first solid particles, drying the first slurry to form an infiltrated CMC including the first solid particles, depositing a second slurry including a carrier material and second solid particles on a surface of the infiltrated CMC, where the second solid particles include a plurality of fine ceramic particles, a plurality of coarse ceramic particles, and a plurality of diamond particles, drying the second slurry to form an article having an outer surface layer including the second solid particles on the infiltrated CMC, and infiltrating the article with a molten infiltrant to form a composite article.

14 Claims, 5 Drawing Sheets

(51) Int. Cl.
*C04B 41/52* (2006.01)
*C04B 35/80* (2006.01)
*F01D 5/28* (2006.01)
*B05D 7/24* (2006.01)
*B05D 3/00* (2006.01)
*B05D 7/22* (2006.01)

(52) U.S. Cl.
CPC ............ *F01D 5/282* (2013.01); *F01D 5/284* (2013.01); *B05D 3/002* (2013.01); *B05D 3/007* (2013.01); *B05D 7/22* (2013.01); *B05D 7/24* (2013.01); *B05D 2203/30* (2013.01); *B05D 2259/00* (2013.01); *B05D 2401/10* (2013.01); *B05D 2401/20* (2013.01); *F05D 2240/11* (2013.01); *F05D 2300/224* (2013.01); *F05D 2300/6033* (2013.01)

(58) Field of Classification Search
CPC ............ C04B 41/4539; C04B 41/5059; C04B 41/4547; C04B 41/5002; C04B 41/53; C04B 41/5096; C04B 35/56; C04B 35/565; C04B 35/71; C04B 35/803; C04B 35/806; C04B 41/0018; C04B 41/45; C04B 41/4505; C04B 41/4535; C04B 41/457; C04B 41/4584; C04B 41/4596; C04B 41/50; C04B 41/5006; C04B 41/5024; C04B 41/5031; C04B 41/5035; C04B 41/5057; C04B 41/5058; C04B 41/5066; C04B 41/522; C04B 41/524; C04B 41/526; C04B 41/80; C04B 41/81; C04B 41/85; F01D 5/28; F01D 5/282; F01D 5/284; B05D 3/002; B05D 3/007; B05D 7/22; B05D 7/24; B05D 2203/30; B05D 2259/00; B05D 2401/10; B05D 2401/20; F05D 2300/6033; F05D 2300/611; F05D 2240/11; F05D 2300/224; F05D 2230/30; F05D 2230/31; F05D 2230/90; F05D 2240/00; F05D 2300/20; F05D 2300/211; F05D 2300/2261
See application file for complete search history.

(56) References Cited

U.S. PATENT DOCUMENTS

| | | |
|---|---|---|
| 5,952,100 A | 9/1999 | Corman et al. |
| 6,245,424 B1 | 6/2001 | Lau et al. |
| 6,403,158 B1 | 6/2002 | Corman |
| 6,609,452 B1 | 8/2003 | McCormick et al. |
| 6,855,428 B2 | 2/2005 | Lau et al. |
| 7,378,362 B2 | 5/2008 | Nixon et al. |
| 7,686,990 B2 | 3/2010 | Gray |
| 7,842,335 B2 | 11/2010 | Skoog et al. |
| 7,942,638 B2 | 5/2011 | Eichmann et al. |
| 8,043,720 B2 | 10/2011 | Corman et al. |
| 8,474,362 B1 | 7/2013 | Karandikar et al. |
| 8,846,218 B2 | 9/2014 | Bouillon et al. |
| 2006/0163773 A1 | 7/2006 | Gray |
| 2011/0268577 A1 | 11/2011 | Bouillon et al. |
| 2013/0122259 A1 | 5/2013 | Lee |
| 2013/0287941 A1 | 10/2013 | Gray |
| 2015/0004324 A1 | 1/2015 | Bouillon et al. |
| 2016/0214907 A1 | 7/2016 | Shim et al. |
| 2016/0279744 A1 | 9/2016 | Harris |
| 2016/0326064 A1 | 11/2016 | Shim et al. |
| 2017/0247787 A1* | 8/2017 | Saha ............... C04B 35/505 |
| 2017/0313627 A1* | 11/2017 | Shim ............... C04B 35/806 |
| 2019/0185384 A1* | 6/2019 | Shim ............... C04B 35/806 |

FOREIGN PATENT DOCUMENTS

| | | | |
|---|---|---|---|
| EP | 1636148 B1 | 7/2010 | |
| EP | 3241817 A1 | 11/2017 | |
| JP | 2000344582 A | 12/2000 | |
| WO | 9824737 A1 | 6/1998 | |
| WO | WO-9824737 A1 * | 6/1998 | ............ B28B 1/265 |

OTHER PUBLICATIONS

Extended European Search Report from counterpart European Application No. 17164905.6, dated Sep. 12, 2017, 8 pp.
Communication Pursuant to Rule 69 EPC and 70a(1) EPC, dated Nov. 13, 2017, from counterpart European Application No. 17164905.6, 2 pp.
Response to Extended European Search Report, dated Sep. 12, 2017, and Communication pursuant to Rule 69 EPC and 70a(1) EPC, dated Nov. 13, 2017, from counterpart European Application No. 17164905.6, filed May 1, 2018, 5 pp.
Abramshe et al., "Effective Cleaning Methods and Best Practices of Synthetic Industrial Diamond," Mar. 1, 2007, rdmag.com, 8 pp.
"Product Safety Assessment: DURAMAX Binders," The Dow Chemical Company, Form No. 233-01075-MM-0513, May 13, 2013, 5 pp.
Examination Report from counterpart European Application No. 17164905.6, dated Mar. 4, 2020, 3 pp.
Response to Examination Report dated Mar. 4, 2020, from counterpart European Application No. 17164905.6, filed Jun. 22, 2020, 59 pp.

* cited by examiner

FORMING A SURFACE LAYER ON A CERAMIC MATRIX COMPOSITE ARTICLE

This application claims the benefit of U.S. Provisional Application No. 62/330,575, filed May 2, 2016, and titled, "FORMING A SURFACE LAYER ON A CERAMIC MATRIX COMPOSITE ARTICLE," the entire content of which is incorporated herein by reference.

TECHNICAL FIELD

The present disclosure generally relates to techniques for forming a surface layer on a ceramic matrix composite article.

BACKGROUND

Ceramic matrix composite (CMC) materials may be useful in a variety of contexts where mechanical and thermal properties are important. For example, components of high temperature mechanical systems, such as gas turbine engines, may be made from CMCs. CMCs may be resistant to high temperatures, but some CMCs may react with some elements and compounds present in the operating environment of high temperature mechanical systems, such as water vapor. These reactions may damage the CMC and reduce mechanical properties of the CMC, which may reduce the useful lifetime of the component. A CMC component may be coated with an environmental barrier coating, which may reduce exposure of the CMC component to elements and compounds present in the operating environment of high temperature mechanical systems.

SUMMARY

In some examples, the disclosure describes a method that includes infiltrating a ceramic matrix composite (CMC) substrate with a first slurry to at least partially fill at least some inner spaces of the CMC substrate, where the first slurry comprises first solid particles including a first ceramic material, drying the first slurry to form an infiltrated CMC including the first solid particles, depositing a second slurry that includes a carrier material and second solid particles on a surface of the infiltrated CMC, where the second solid particles include a plurality of fine ceramic particles defining a fine particle average size, a plurality of coarse ceramic particles defining a coarse particle average size, and a plurality of diamond particles, where the fine particle average size is less than the coarse particle average size, drying the second slurry to form an article having an outer surface layer including the second solid particles on the infiltrated CMC, and infiltrating the article with a molten infiltrant to form a composite article.

In some examples, the disclosure describes an article that includes a CMC substrate including a reinforcement material and a plurality of inner spaces, first solid particles including a first ceramic material, wherein the first solid particles at least partially fill the inner spaces of the CMC substrate, and an outer surface layer on the CMC substrate, where the outer surface layer includes second solid particles comprising a plurality of fine ceramic particles defining a fine particle average size, a plurality of coarse ceramic particles defining a coarse particle average size, and a plurality of diamond particles, where the fine particle average size is less than the coarse particle average size.

The details of one or more examples are set forth in the accompanying drawings and the description below. Other features, objects, and advantages will be apparent from the description and drawings, and from the claims.

DETAILED DESCRIPTION

The disclosure describes techniques for forming a surface layer of an article including a ceramic matric composite (CMC) using a slurry containing a ceramic material. In some examples, the surface layer is formed by applying a first slurry to the CMC substrate to infiltrate the CMC substrate and, in some examples form a first surface layer of ceramic material in the CMC substrate; drying the first slurry to form an infiltrated CMC; and applying a second slurry coating to the infiltrated CMC. In some examples, by applying the second or more slurry coatings to the infiltrated CMC, the resultant solid content of the second surface layer may be increased compared to an infiltrated CMC that has undergone only a single slurry application. In some examples, by increasing the solid content of the second surface layer of the infiltrated CMC, the durability of resultant CMC article may be improved. For example, the second surface layer may include excess material formed from the second slurry coating (e.g., excess solid particles), with or without three-dimensional surface features. The excess material may be machined (e.g., polished or tumbled) to remove at least some of the excess material, which may facilitate conforming the article to dimensional tolerances, e.g., for fitting the article to another component. The excess material may reduce a likelihood of damaging the underlying CMC substrate (e.g., reinforcement material in the CMC) during subsequent machining.

Figure 1:
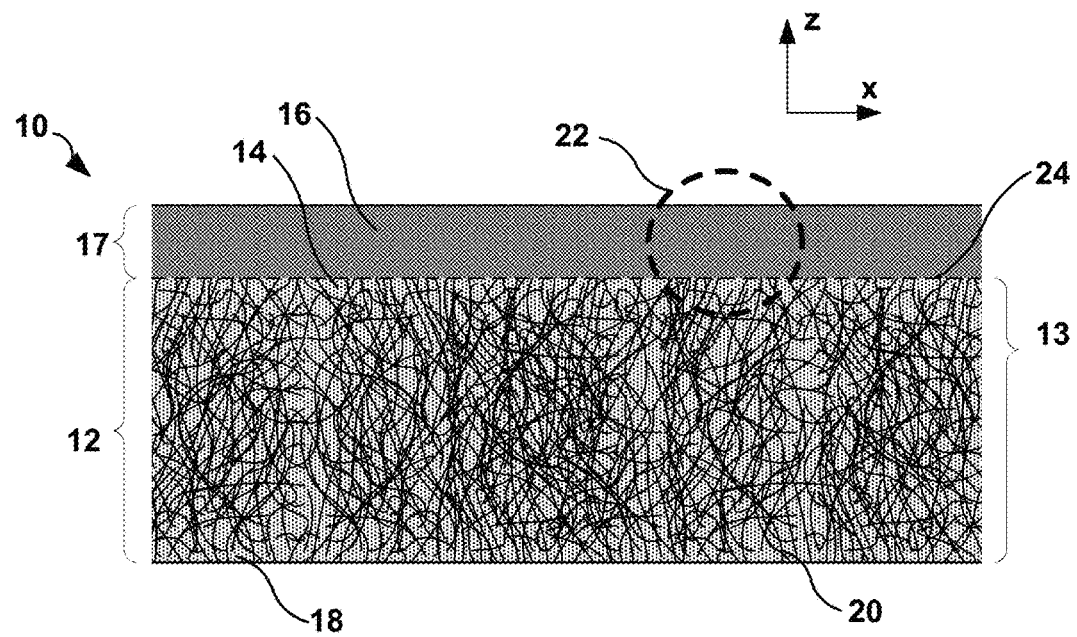
FIG. 1 is a conceptual diagram illustrating a cross-sectional view of an example article including a ceramic matrix composite (CMC) that includes a second surface layer formed from a second slurry including a plurality of coarse and fine ceramic particles and a plurality of diamond particles.

FIG. 1 is a conceptual diagram illustrating an example article 10 including a CMC substrate 12 that includes reinforcement material 20. As shown inner spaces or pores 18 between reinforcement material 20 may be infiltrated with a first solid particles 14 by the deposition and drying of a first slurry, resulting in infiltrated CMC 13. Article 10 also includes an outer (or second) surface layer 17 including second solid particles 16 formed via the deposition and drying of a second slurry. The second solid particles 16 may include a mixture of coarse ceramic particles, fine ceramic particles, and diamond particles. The first slurry and the second slurry may be formulated with the same or different compositions.

In some examples, article 10 may be a component of a high temperature mechanical system. For example, article 10 may be a seal segment, a blade track, an airfoil, a blade, a vane, a combustion chamber liner, or the like, of a gas turbine engine.

Figure 2:
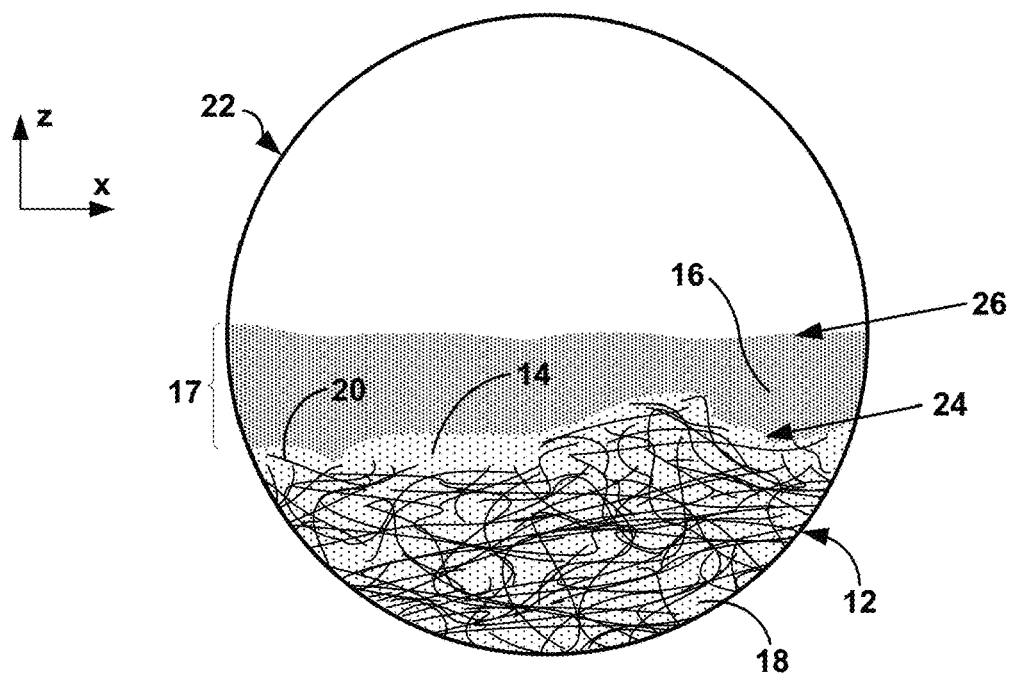
FIG. 2 is a conceptual diagram illustrating a cross-sectional view of a zoomed in section of the article from FIG. 1.

CMC substrate 12 of article 10 includes reinforcement material 20, which defines inner spaces 18. In some examples, reinforcement material 20 may include continuous or discontinuous fibers. For example, reinforcement material 20 may include discontinuous whiskers, platelets, or particulates composed of SiC, $Si_3N_4$, $Al_2O_3$, aluminosilicate, $SiO_2$, or the like. In some examples, reinforcement material 20 may include continuous monofilament or multifilament fibers of one or more of the materials listed above, such as SiC. While FIGS. 1 and 2 illustrate reinforcement material 20 as including non-woven fibers, in some examples reinforcement material 20 may be include one or more layers of woven fibers.

In some examples, reinforcement material 20 may include fibers coated with an optional fiber interface material that may be used to rigidize fibers, densify CMC substrate 12, or both, prior to the application of the first slurry. In some such examples, the fiber interface material may include, for example, pyrolytic carbon (PyC), boron nitride (BN), or the like and may be deposited on the fibers using any suitable technique such as chemical vapor infiltration (CVI), chemical vapor deposition (CVD), or the like.

Article 10 includes first solid particles 14 deposed in inner spaces 18 (e.g., pores) of CMC substrate 12 using a first slurry. In some examples, first solid particles 14 may include silicon carbide (SiC), silicon nitride ($Si_3N_4$), alumina ($Al_2O_3$), aluminosilicate (e.g., $Al_2SiO_5$), silica ($SiO_2$), boron carbide ($B_4C$), molybdenum carbide ($Mo_2C$), carbon (e.g., diamond particles), or combinations thereof. In some examples, first solid particles 14 may include at least one type of ceramic particle (e.g., SiC, $Si_3N_4$, $B_4C$, or $Mo_2C$ particles) having a uniformly or non-uniformly distributed particle size and optional diamond particles. First solid particles 14 of the first slurry may include particles having an average particle diameter sufficiently small to allow the ceramic particles to infiltrate inner spaces 18 (e.g., open pores) of CMC substrate 12 (e.g., an average particle diameter less than about 20 micrometers). In some examples, first solid particles 14 may be selected to include substantially the same (e.g., the same or nearly the same) components used to form reinforcement material 20. In this way, first solid particles 14 may reduce the stress exerted on CMC substrate 12 as a result of any thermal expansion mismatches between reinforcement material 20 of CMC substrate 12 and first solid particles 14.

In some examples, first solid particles 14 may include a mixture of coarse and fine ceramic particles (e.g., coarse particles that define an average particle size of about 10 micrometers (µm) and about 20 µm and fine particles that define an average particle size of about 0.5 µm to about 5 µm) and diamond particles. In some such examples, as discussed further below, first solid particles 14 may be formulated to have the substantially the same (e.g., the same or nearly the same) mixture of solid materials as the second slurry.

In some examples, the first slurry may include one or more optional additives. The additives may be used to tailor or alter the properties of the first slurry. For example, the one or more optional additives may include matrix precursors or other reactive elements that react with silicon metal or silicon alloy (e.g., carbon) during the melt infiltration process and contribute to the solid materials included in inner spaces 18. In some examples, the one or more optional additives may include a binder (e.g. polyethylene glycol, acrylate co-polymers, latex co-polymers, polyvinyl pyrrolidone co-polymers, polyvinyl butyral, or the like), a dispersant (e.g., ammonium polyacrylate, polyvinyl butyral, a phosphate ester, polyethylene imine, BYK® 110 (available from Byk USA, Inc., Wallingford Conn.), or the like), or the like. In some examples, other additives such as a surfactant (e.g., Dynol™ 607 surfactant available from Air Products) may be included in the slurry mixtures to improve wetting of the slurry. The selection and amount of the one or more optional additive components may depend on the intended application for article 10.

In some examples, the first slurry may be formulated to include about 35% to about 65% by weight carrier material, about 35% to 65% by weight of first solid particles 14 (e.g., more than 50% by weight of the solid materials, e.g., ceramic particles, in the respective slurry), and up to 10% percent by weight optional additives (e.g., up to 8% by weight carbon material, up to 2% by weight surfactant, or the like).

First solid particles 14 may be deposited from a first slurry using a suitable slurry infiltration technique. For example, a first slurry may be prepared that includes first solid particles 14 along with a carrier material (e.g., one or more solvents) and other optional additives. The at least one carrier material may assist with the deposition of first solid particles 14 within inner spaces 18. In some examples, the carrier material may include at least one compatible solvent, including, for example, water, ethanol, isopropyl alcohol, methyl ethyl ketone, toluene, or the like. During the deposition and drying of the first slurry, the carrier material may be substantially removed (e.g., removed or nearly removed) from article 10, leaving behind the solid contents of the first slurry (e.g. first solid particles 14).

During the slurry infiltration process, the first slurry may be deposited on a surface of CMC substrate 12 using any suitable means including, for example, spraying, dip coating, transfer molding, pressure or vacuum infiltration, painting, or the like. In some examples, a vacuum may optionally be drawn prior to slurry introduction to purge gas from inner spaces 18 of CMC substrate 12 and further enhance the infiltration process. The slurry infiltration may be conducted at any suitable temperature, including room temperature (between about 20° C. and about 35° C.). The first slurry infiltration may be enhanced by application of external pressure after slurry introduction, such as a pressure gradient of about one atmosphere. During the slurry infiltration process, the first slurry may be allowed to infiltrate the inner spaces 18 (e.g., pores) of CMC substrate 12. After infiltration, the first slurry may be dried to remove the carrier material, leaving behind the solid contents of the first slurry (e.g., first solid particles 14). In some examples, the infiltration process may also form a surface layer (e.g. a first surface layer) (not shown) on CMC substrate 12 that includes first solid particles 14. In such examples, the surface layer formed by the first slurry may be between about 0 micrometers to about 750 micrometers. In some examples, the surface layer formed by the first slurry may be less than about 125 micrometers or may be substantially indistinguishable from the major surface of CMC substrate 12. In other examples, article 10 may not include a surface layer formed by the first slurry.

In some examples, the infiltration of CMC substrate 12 with the first slurry may be performed using a mold. For example, CMC substrate 12 may be placed and sealed in the inner cavity of a mold. The first slurry including first solid particles 14 may be injected into the mold under pressure allowing the first slurry to coat CMC substrate 12 and infiltrate inner spaces 18. In some examples, the mold may be configured to define an inner cavity sufficiently sized to allow for the formation of a first surface layer (not shown) during the infiltration process. The mold may be formed of any suitable material including, for example, graphite, silica, alumina, or the like. The material from which the mold is formed may be selected to allow release of article 10 after completion of the infiltration step, and to be sufficiently non-reactive with the materials used in forming article 10.

Article 10 also includes outer surface layer 17 formed by the deposition and drying of a second slurry on major surface 24 of infiltrated CMC 13. In some examples, deposition and drying of the second slurry may help to level the second surface 26 of resultant article 10. For example, FIG. 2 illustrates a conceptual diagram of a cross-sectional view of a zoomed in section 22 of article 10 from FIG. 1, which exaggerates the microstructure of article 10. As shown in FIG. 2, the deposition of the first slurry including first solid particles 14 infiltrates at least some inner spaces 18 of CMC substrate 12. In some examples, due to the structure of CMC substrate 12, resultant major surface 24 of infiltrated CMC 13 may define a textured surface. For example, the structure of CMC substrate 12 may include multiple peaks and valleys due to, for example, the varied thickness created by underlying reinforcement material 20. The formation of outer surface layer 17 may reduce the presence of the peaks and valleys along outer major surface 26, thereby establishing a smoother surface finish. The increased smoothness of outer major surface 26 may assist with subsequent machining processes, for example, by reducing the amount of surface material (e.g. solid particles 16) that needs to be removed to establish a substantially planar (e.g., planar or nearly planar) surface. In some examples, the smoothness of outer surface layer 17 may be improved by formulating the second slurry to have a viscosity less than about 500 cP (e.g., less than 300 cP) to maintain sufficient flowability of the second slurry during application. Additionally or alternatively, the smoothness of outer surface layer 17 may be improved by mechanically smoothing the surface of the second slurry (e.g., scraping, rolling, spreading, or the like) once the slurry has been deposited on infiltrated CMC 13 prior to drying the second slurry to remove any high spots and assist with leveling of solid particles 16.

The deposition and drying of the second slurry may also help protect the underlying reinforcement material 20 during subsequent processing as compared to applying only a single slurry to CMC substrate 12. For example, due to the infiltration process of the first slurry, the resultant first surface layer, if any, formed on CMC substrate 12 by first solid particles 14 may be discontinuous and define a variable thickness. The discontinuity of the first surface layer formed by the first slurry may establish sections where the first surface layer becomes relatively thin. In some examples, subsequent machining of major surface 24 of infiltrated CMC 13 may cause reinforcement material 20 (e.g., fibers) to become partially exposed or damaged, which may generate detrimental effects to the durability of article 10. By depositing and drying the second slurry on major surface 24, the buildup of second solid particles 16 may provide a sufficient coverage by outer surface layer 17 of solid materials such that reinforcement material 20 is sufficiently protected during subsequent machining. Once the second slurry has dried, outer surface layer 17 may be machined to remove any high spots in the layer (e.g., excess solid particles 16) without damaging or contacting the underlying reinforcement material 20 of CMC substrate 12. A subsequent molten infiltrant may then be applied to further densify article 10. In some examples, outer surface layer 17 may define an average thickness as measured in the z-direction of FIGS. 1 and 2 between about 25 micrometers to about 750 micrometers.

Figure 3:
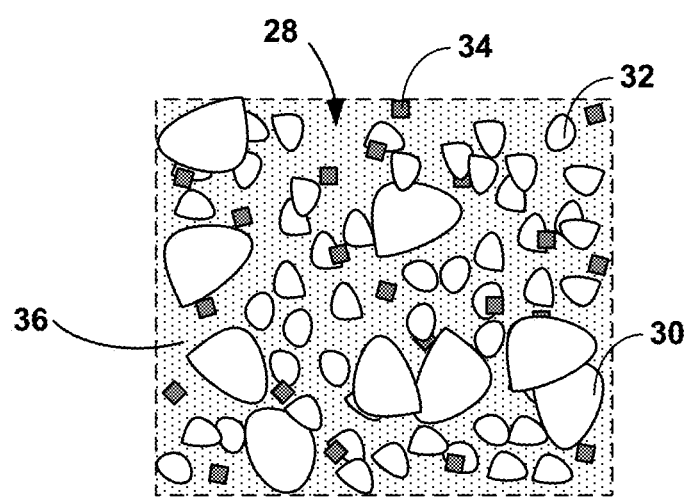
FIG. 3 is an enlarged view of an example of a second slurry including a plurality of coarse and fine ceramic particles and a plurality of diamond particles that may be used to form the outer surface layer of the article from FIG. 1.

FIG. 3 is an enlarged view of an example of a second slurry 28 that may be used to form outer surface layer 17 that includes second solid particles 16. Second slurry 28 may include solid materials including a second solid particles 16 mixed with a suitable carrier material 36 (e.g., solvents) and any optional additives. In some examples, solid particles 16 may include a plurality of coarse ceramic particles 30, a plurality of fine ceramic particles 32, and a plurality of diamond particles 34 (collectively "second solid particles 16").

Second slurry 28 may be prepared and applied to infiltrated CMC 13 using a similar technique to those discussed with respect to the deposition of the first slurry. For example, second slurry 28 may be deposited on a surface of infiltrated CMC 13 by spraying, painting, dip coating, transfer molding, pressure or vacuum infiltration, or the like. The application of second slurry 28 may be conducted at any suitable temperature, including room temperature (between about 20° C. and about 35° C.). In some examples, the deposition process of second slurry 28 may include application of external pressure after the slurry application, such as a pressure gradient of about one atmosphere. Once applied, second slurry 28 may be dried to remove carrier material 36, thereby depositing the solid materials including second solid particles 16 on infiltrated CMC 13 (e.g., on major surface 24) to form outer surface layer 17.

Carrier material 36 may include at least one solvent compatible with second solid particles 16, including, for example, water, ethanol, isopropyl alcohol, methyl ethyl ketone, toluene, or the like. In some examples, second slurry 28 may include about 30 percent by volume (vol. %) to about 60 vol. % carrier material 36 and about 70 vol. % to about 40 vol. % solid materials (e.g., second solid particles 16). During drying of second slurry 28, carrier material 36 may be substantially removed (e.g., removed or nearly removed) second slurry 28, leaving behind the solid contents of second slurry 28 (e.g., second solid particles 16).

In some examples, the composition of second solid particles 16 may be selected to include one or more of substantially the same (e.g., the same or nearly same) solid particles used in first solid particles 14 (e.g., SiC, $Si_3N_4$, $Al_2O_3$, $Al_2SiO_5$, $SiO_2$, $B_4C$, $Mo_2C$, diamond, or the like) and/or materials that are used in forming any additional outer layers (e.g., bond coats, thermal barrier coatings, environmental coating, or the like) that are subsequently applied to outer surface layer 17. For example, second slurry 28 may be prepared to have a composition that is substantially the same (e.g., the same or nearly same) as the first slurry. In this way, second solid particles 16 may reduce the stress exerted on article 10 and/or additional outer layers as a result of any thermal expansion mismatches between adjacent layers of article 10.

As shown in FIG. 3, second slurry 28 may include a plurality of coarse ceramic particles 30 and a plurality of fine ceramic particles 32. The coarse and fine ceramic particles may include particles of silicon carbide (SiC), silicon nitride ($Si_3N_4$), alumina ($Al_2O_3$), aluminosilicate (e.g., $Al_2SiO_5$), silica ($SiO_2$), boron carbide ($B_4C$), molybdenum carbide ($Mo_2C$), or a combination thereof. In some examples, coarse ceramic particles 30 may define an average particle size of between about 10 μm and about 20 μm, with a standard deviation of less than about ±3 μm. In some examples, fine ceramic particles 30 may define an average particle size of about 0.5 μm to about 5 μm, with a standard deviation of less than about ±0.5 μm. In some examples, coarse ceramic particles 30 may account for about 40 vol. % to about 50 vol. % of the solid material (e.g., second solid particles 16) in second slurry 28 and fine ceramic particles 32 may account for about 40 vol. % to about 59 vol. % of the solid material (e.g., second solid particles 16) in second slurry 28. In some examples, the volumetric ratio of coarse ceramic particles 30 to fine ceramic particles 32 may between about 0.1:1 to about 2:1. In some examples, the volumetric ratio of coarse ceramic particles 30 to fine ceramic particles 32 may be about 1:1.

In some examples, plurality of fine ceramic particles 32 within second slurry 28 may increase the relative amount of solid material along major surface 24 (compared to a slurry that includes only coarse ceramic particles 30), or that becomes infiltrated in CMC 13 due to ability of the smaller sized fine particles to infiltrate within any pores that remain in CMC substrate 12 after the deposition of first solid particles 14 and to pack more efficiently (leaving less free space between particles). Additionally or alternatively, fine ceramic particles 32 may also increase the capillary force among second solid particles 16, which as described further below, may help reduce the exudation of the molten infiltrant (e.g., silicon or silicon alloy) during subsequent processing.

In some examples, coarse ceramic particles 30 may help to maintain sufficiently sized interstices (e.g., pathways) within the deposited outer surface layer 17 to allow for infiltration of the molten metal or metal alloy infiltrant within the inner recesses of CMC 13 during subsequent processing. Additionally or alternatively, in some examples, the presence of coarse ceramic particles 30 in second slurry 28 may help reduce or prevent shrinkage and or cracking of the outer surface layer 17 as second slurry 28 is dried.

Second slurry 28 may also include a plurality of diamond particles 34. Diamond particles 34 may provide a reactive carbon source in second solid particles 16 that can be converted to a metal carbide during subsequent melt infiltration processing. In some such examples, the amount and size of diamond particles 34 may be selected so substantially all (e.g., all or nearly all) of the diamond particle material reacts with the metal or metal alloy infiltrant to form a metal carbide. In some examples, smaller sized diamond particles 34 may be more efficiently converted to metal carbide due to a higher surface area-to-volume ratio of diamond particles 34. In some examples, diamond particles 34 may define an average diamond particle diameter between about 0.1 μm to about 5 μm and account for between about 1 vol. % and about 10 vol. % of the solid material in second slurry 28. In some examples the diamond particles 34 may account for between about 2 vol. % and about 10 vol. % of the solid material (e.g., second solid particles 16) in second slurry 28, or between about 3 vol. % and about 10 vol. % of the solid material (e.g., second solid particles 16) in second slurry 28.

Second slurry 28 may also include one or more optional additives. Such additives may be used to tailor or alter the properties of second slurry 28. For example, the one or more optional additives may include a binder (e.g., polyethylene glycol, acrylate co-polymers, latex co-polymers, polyvinyl pyrrolidone co-polymers, polyvinyl butyral, or the like), a dispersant (e.g., ammonium polyacrylate, polyvinyl butyral, a phosphate ester, polyethylene imine, BYK® 110 (available from Byk USA, Inc., Wallingford Conn.), or the like), or the like. In some examples, other additives such as a surfactant (e.g., Dynol™ 607 surfactant available from Air Products) may be included in the slurry mixtures to improve wetting of the slurry. The selection and amount of the one or more optional additive components may depend on the intended application for article 10. In some examples, the one or more optional additives may account for up to about 20 vol. % of second slurry 28.

The relative amount of second solid particles 16 in second slurry 28 may be selected to provide a relatively high solid loading content of second solid particles 16 (e.g., up to about 70 vol. %) compared to other materials yet still maintain a workable viscosity (e.g., less than about 1000 centipoise (cP)). In some examples, the relatively high solid loading content of second slurry 28 may also reduce that amount of molten metal infiltrant material used to during subsequent melt infiltration cycles and, ultimately, may reduce an amount of excess metal infiltrant left in final CMC article (e.g., article 10 after subsequent melt infiltration). Because unreacted metal infiltrant (e.g., silicon or silicon alloy) may negatively affect properties of the final CMC article, reducing the amount of metal infiltrant that remains in the final CMC article may improve properties of the article.

In some examples, the deposited and dried first solid particles 14 of the first slurry may allow for outer surface layer 17 to obtain a higher solid content percentage (e.g., volume percentage of deposited solid materials occupying a given volume) compared to the solid content percentage that may otherwise be established if the only a single slurry mixture were applied to CMC substrate 12. For example, in examples in which the first slurry and second slurry 28 are substantially the same compositions (e.g. the same or nearly the same), the deposition and drying of first solid particles 14 will infiltrate inner spaces 18 of CMC substrate 12. Solid particles 14 deposited in inner spaces 18 may define a first solid content percentage. The subsequent deposition and drying of second slurry 28 forms outer surface layer 17, which may define a second solid content percentage that is greater (e.g., more dense) than the first solid content percentage, despite the first slurry and second slurry 28 having substantially the same compositions. In some examples, the second solid content percentage may be greater than the first solid content percentage by as much as 16 percent (e.g., a ratio of the respective solid content percentages). While not wanting to be bound to a specific scientific principle, it is believed that the greater solid content percentage of outer surface layer 17 may be the result of carrier material 36 (e.g., solvents) from second slurry 28 being wicked into first solid particles 14 (e.g., wicked into inner spaces 18). The movement of carrier material 36 into first solid particles 14 pulls the solid materials of the second slurry (e.g. solid particles 16) toward major surface 24, which may result in outer surface layer 17 having a tighter packing arrangement of the solid materials and overall higher solid content percentage compared to the solid content within inner spaces 18 or within a surface layer formed by only a single application of a slurry mixture (e.g., the first surface layer formed by the first slurry if the second slurry were not applied to article 10). The greater solid content percentage of outer surface layer 17 may improve the durability of article 10, reduce the chance of cracking during subsequent machining of the outer surface, or both.

Additionally or alternatively, the selection of second solid particles 16 of second slurry 28 may provide one or more advantages compared to other slurry mixtures or slurry mixtures that exclude one or more of second solid particles 16. For example, including coarse ceramic particles 30, fine ceramic particles 32, and diamond particles 34 may help increase the resultant packing density of the solid particles (e.g., ceramic materials) deposited on CMC 13 compared slurries that include single sized particles or applied using only a single slurry application (e.g., only applied via the first slurry). In some examples, the relative ratio of coarse ceramic particles 30 to fine ceramic particles 32 to diamond particles 34 may be selected to deposit relatively high density of solid particles (e.g., ceramic materials) on CMC 13 as outer surface layer 17, while maintaining sufficiently sized interstices within outer surface layer 17 (e.g., the pathways or spacing between adjacent second solid particles 16) to allow the melt infiltrant to penetrate the inner recesses of outer surface layer 17 and, in some examples, inner spaces 18.

In some examples, including diamond particles 34 in second slurry 28, and optionally the first slurry, may provide one or more advantages compared to other carbon sources such as carbon black or graphite. For example, diamond particles 34 may contain a lower quantity of impurities compared to other carbon sources, which may correspond to a lower amount of impurities introduced into article 10. Diamond particles 34 also have a higher relative density (e.g., about 3.5 g/cm$^3$) compared to other carbon sources (e.g., density of carbon black is about 1.8-2.1 g/cm$^3$). As a result, the amount of carbon loading in the slurry (e.g., the weight percent (wt. %) of free carbon in second slurry 28) may be much higher for diamond particles 34 compared to other carbon sources added to the slurry utilizing the same relative volume percentage. Additionally, diamond particles 34 have been found to have a relatively small impact on the viscosity of a slurry compared to other carbon sources. As a result, the volume percentage of diamond particles 34 added to the slurry (e.g., second slurry 28) may be relatively high (e.g., about 10 vol. %) compared to other carbon sources without significantly increasing the viscosity of the slurry. A slurry with viscosity that is too high is no longer viable as a slurry. In some examples, the combination of the higher density of diamond particles 34 and the higher volume percentage of diamond particles 34 added to second slurry 28 compared to other carbon sources may significantly increase the amount of carbon material deposited in outer surface layer 17 (or if incorporated in the first slurry, the amount of carbon material infiltrated within CMC substrate 12), significantly increase the packing density of the outer surface layer 17, or a combination of both.

Additionally or alternatively, the inclusion of diamond particles 34 in second slurry 28, and optionally the first slurry, may result in a more efficient infiltration process as the molten metal infiltrant is introduced and reacts with diamond particles 34 to form metal carbide (e.g., conversion of molten silicon to SiC), compared to other carbon sources, thereby reducing the relative amount of molten metal infiltrant introduced into article 10. The melt infiltration process may help improve the overall density of final CMC article, however, unreacted molten metal infiltrant (e.g., silicon or silicon alloy) which may remain as a result of the infiltration process imbedded in the CMC article can negatively impact the durability and useful life of the resultant CMC. The use of diamond particles 34 and the high solid loading content of outer surface layer 17 may help reduce the amount of molten metal infiltrant material introduced into article 10 during the melt infiltration process, improve the efficiency in which molten metal infiltrant material is converted to metal carbide by reaction with diamond particles 34, reduce the amount of excess molten metal infiltrant that remains at the end of the melt infiltration process, or a combination thereof.

In some examples, the presence of diamond particles 34 in outer surface layer 17 may also help reduce or inhibit the growth of surface nodules (e.g., silicon nodules) on the second surface 26 of the resultant CMC article that may otherwise form on the surface of a CMC as a result of a melt infiltration process. For example, without wanting to be bound to a specific scientific theory, it is believed that the silicon nodules form as a result of excess silicon from the silicon melt infiltration process expanding as the silicon solidifies, thereby driving the excess silicon material out of article 10 and resulting in the growth of silicon nodules on the external surface. In some examples, the silicon nodules may be removed from the exterior surface of the resultant CMC article though additional machining; however, such techniques may crack or otherwise damage the CMC article, thereby reducing the useful life of the article.

The presence of diamond particles 34 in outer surface layer 17 may help reduce or inhibit the formation of silicon nodules on second surface 26 of article 10 by reacting with the molten silicon infiltrant to form SiC. Additionally or alternatively, as the reaction progresses, the relatively high density of diamond particles 34 (e.g., about 3.5 g/cm$^3$) compared to other carbon sources (e.g., carbon black is about 1.8-2.1 g/cm$^3$), and compared to the relative density of SiC (e.g., 3.2 g/cm$^3$) may cause the volumetric space occupied by the SiC produced by the conversion of diamond particles 34 to be relatively high compared to a conversion process using other carbon sources. In some examples, the described conversion process may cause the interstices (e.g., pathways) between the infiltrated coarse and fine ceramic particles 30 and 32 of outer surface layer 17 to become constricted or closed as diamond particles 34 are converted to SiC. As a result of the process, the constricted interspatial pathways between the infiltrated coarse and fine ceramic particles 30 and 28 may reduce or inhibit any excess silicon, to the extent present, from exiting article 10 during the solidification process and forming silicon nodules on second surface 26. In contrast to diamond particles 34, other carbon sources may increase or maintain relatively large sized interstices between coarse and fine ceramic particles 30 and 32 as the carbon source is converted to metal carbide, thereby maintaining pathways for which excess silicon may exit article 10 to form silicon nodules.

In some examples, the melt infiltration process may increase the overall density of article 10, e.g., by filling voids between particles of first solid particles 14 and voids between particles of solid particles 16. In some examples, the molten metal infiltrant may include Si metal or Si metal alloy, B metal or B metal alloy, Al metal or Al metal alloy, Y metal or Y metal alloy, Ti metal or Ti metal alloy, Zr metal or Zi metal alloy, or the like. In some examples, the molten metal infiltrant includes Si metal or Si metal alloy (e.g., Si and BN powder).

In some examples, article 10 may also include one or more optional outer coatings applied to outer surface layer 17 including, for example, a bond coat, an environmental barrier coating (EBC), an abradable coating layer, a calcia-magnesia-aluminosilicate (CMAS)-resistant layer, or the like. In some examples, a single layer of the one or more optional outer coatings may perform two or more of these functions.

In some examples, article 10 may include a bond coat (not shown) that includes any useful material to improve adhesion between one or more adjacent layers of article 10. In some examples, the bond coat may include silicon metal, alone, or mixed with at least one other constituent including, for example, at least one of a transition metal carbide, a transition metal boride, or a transition metal nitride; mullite (aluminum silicate, $Al_6Si_2O_{13}$), silica, a silicide, or the like. The bond coat may be formed on outer surface layer 17 using, for example, plasma spraying, physical vapor deposition (PVD), electron beam physical vapor deposition (EB-PVD), directed vapor deposition (DVD), chemical vapor deposition (CVD), cathodic arc deposition, slurry deposition, sol-gel deposition, electrophoretic deposition, or the like.

Additionally or alternatively, the one or more optional outer coatings on article 10 may include an environmental barrier coatings (EBC) (not shown), which may provide environmental protection, thermal protection, and/or CMAS-resistance to CMC substrate 12. An EBC layer may include at least one of a rare earth oxide, a rare earth silicate, an aluminosilicate, or an alkaline earth aluminosilicate. For example, an EBC layer may include mullite, barium strontium aluminosilicate (BSAS), barium aluminosilicate (BAS), strontium aluminosilicate (SAS), at least one rare earth oxide, at least one rare earth monosilicate ($RE_2SiO_5$, where RE is a rare earth element), at least one rare earth disilicate ($RE_2Si_2O_7$, where RE is a rare earth element), or combinations thereof. The rare earth element in the at least one rare earth oxide, the at least one rare earth monosilicate, or the at least one rare earth disilicate may include at least one of Lu (lutetium), Yb (ytterbium), Tm (thulium), Er (erbium), Ho (holmium), Dy (dysprosium), Tb (terbium), Gd (gadolinium), Eu (europium), Sm (samarium), Pm (promethium), Nd (neodymium), Pr (praseodymium), Ce (cerium), La (lanthanum), Y (yttrium), or Sc (scandium). In some examples, the at least one rare earth oxide includes an oxide of at least one of Yb, Y, Gd, or Er.

In some examples, an EBC layer may include at least one rare earth oxide and alumina, at least one rare earth oxide and silica, or at least one rare earth oxide, silica, and alumina. In some examples, an EBC layer may include an additive in addition to the primary constituents of the EBC layer. For example, an EBC layer may include at least one of $TiO_2$, $Ta_2O_5$, $HfSiO_4$, an alkali metal oxide, or an alkali earth metal oxide. The additive may be added to the EBC layer to modify one or more desired properties of the EBC layer. For example, the additive components may increase or decrease the reaction rate of the EBC layer with CMAS, may modify the viscosity of the reaction product from the reaction of CMAS and the EBC layer, may increase adhesion of the EBC layer to the bond coat or outer surface layer 17, may increase or decrease the chemical stability of the EBC layer, or the like.

In some examples, the EBC layer may be substantially free (e.g., free or nearly free) of hafnia and/or zirconia. Zirconia and hafnia may be susceptible to chemical attack by CMAS, so an EBC layer substantially free of hafnia and/or zirconia may be more resistant to CMAS attack than an EBC layer that includes zirconia and/or hafnia.

In some examples, the EBC layer may have a dense microstructure, a columnar microstructure, or a combination of dense and columnar microstructures. A dense microstructure may be more effective in preventing the infiltration of CMAS and other environmental contaminants, while a columnar microstructure may be more strain tolerant during thermal cycling. A combination of dense and columnar microstructures may be more effective in preventing the infiltration of CMAS or other environmental contaminants than a fully columnar microstructure while being more strain tolerant during thermal cycling than a fully dense microstructure. In some examples, an EBC layer with a dense microstructure may have a porosity of less than about 20 vol. %, such as less than about 15 vol. %, less than 10 vol. %, or less than about 5 vol. %, where porosity is measured as a percentage of pore volume divided by total volume of the EBC layer.

Additionally or alternatively, the one or more optional outer coatings on article 10 may include an abradable layer (not shown). The abradable layer may include at least one of a rare earth oxide, a rare earth silicate, an aluminosilicate, or an alkaline earth aluminosilicate. For example, an EBC layer may include mullite, barium strontium aluminosilicate (BSAS), barium aluminosilicate (BAS), strontium aluminosilicate (SAS), at least one rare earth oxide, at least one rare earth monosilicate ($RE_2SiO_5$, where RE is a rare earth element), at least one rare earth disilicate ($RE_2Si_2O_7$, where RE is a rare earth element), or combinations thereof. The rare earth element in the at least one rare earth oxide, the at least one rare earth monosilicate, or the at least one rare earth disilicate may include at least one of Lu (lutetium), Yb (ytterbium), Tm (thulium), Er (erbium), Ho (holmium), Dy (dysprosium), Tb (terbium), Gd (gadolinium), Eu (europium), Sm (samarium), Pm (promethium), Nd (neodymium), Pr (praseodymium), Ce (cerium), La (lanthanum), Y (yttrium), or Sc (scandium). In some examples, the at least one rare earth oxide includes an oxide of at least one of Yb, Y, Gd, or Er.

The abradable layer may be porous. Porosity of the abradable layer may reduce a thermal conductivity of the abradable layer and/or may affect the abradability of the abradable layer. In some examples, the abradable layer includes porosity between about 10 vol. % and about 50 vol. %. In other examples, the abradable layer includes porosity between about 15 vol. % and about 35 vol. %, or about 20 vol. %. Porosity of the abradable layer is defined herein as a volume of pores or cracks in the abradable layer divided by a total volume of the abradable layer (including both the volume of material in the abradable layer and the volume of pores/cracks in the abradable layer).

The abradable layer may be formed using, for example, a thermal spraying technique, such as, for example, plasma spraying. Porosity of the abradable layer may be controlled by the use of coating material additives and/or processing techniques to create the desired porosity. In some examples, substantially closed pores may be desired.

For example, a coating material additive that melts or burns at the use temperatures of the component (e.g., a blade track) may be incorporated into the coating material that forms the abradable layer. The coating material additive may include, for example, graphite, hexagonal boron nitride, or a polymer such as a polyester, and may be incorporated into the coating material prior to deposition of the coating material over outer surface layer 17 to form the abradable layer. The coating material additive then may be melted or burned off in a subsequent heat treatment, or during operation of the gas turbine engine, to form pores in the abradable layer. The post-deposition heat-treatment may be performed at up to about 1500° C.

The porosity of the abradable layer can also be created and/or controlled by plasma spraying the coating material using a co-spray process technique in which the coating material and coating material additive are fed into the plasma stream with two radial powder feed injection ports. The feed pressures and flow rates of the coating material and coating material additive may be adjusted to inject the material on the outer edge of the plasma plume using direct 90 degree angle injection. This may permit the coating material particles to soften but not completely melt and the coating material additive to not burn off but rather soften sufficiently for adherence in the abradable layer.

Figure 4:
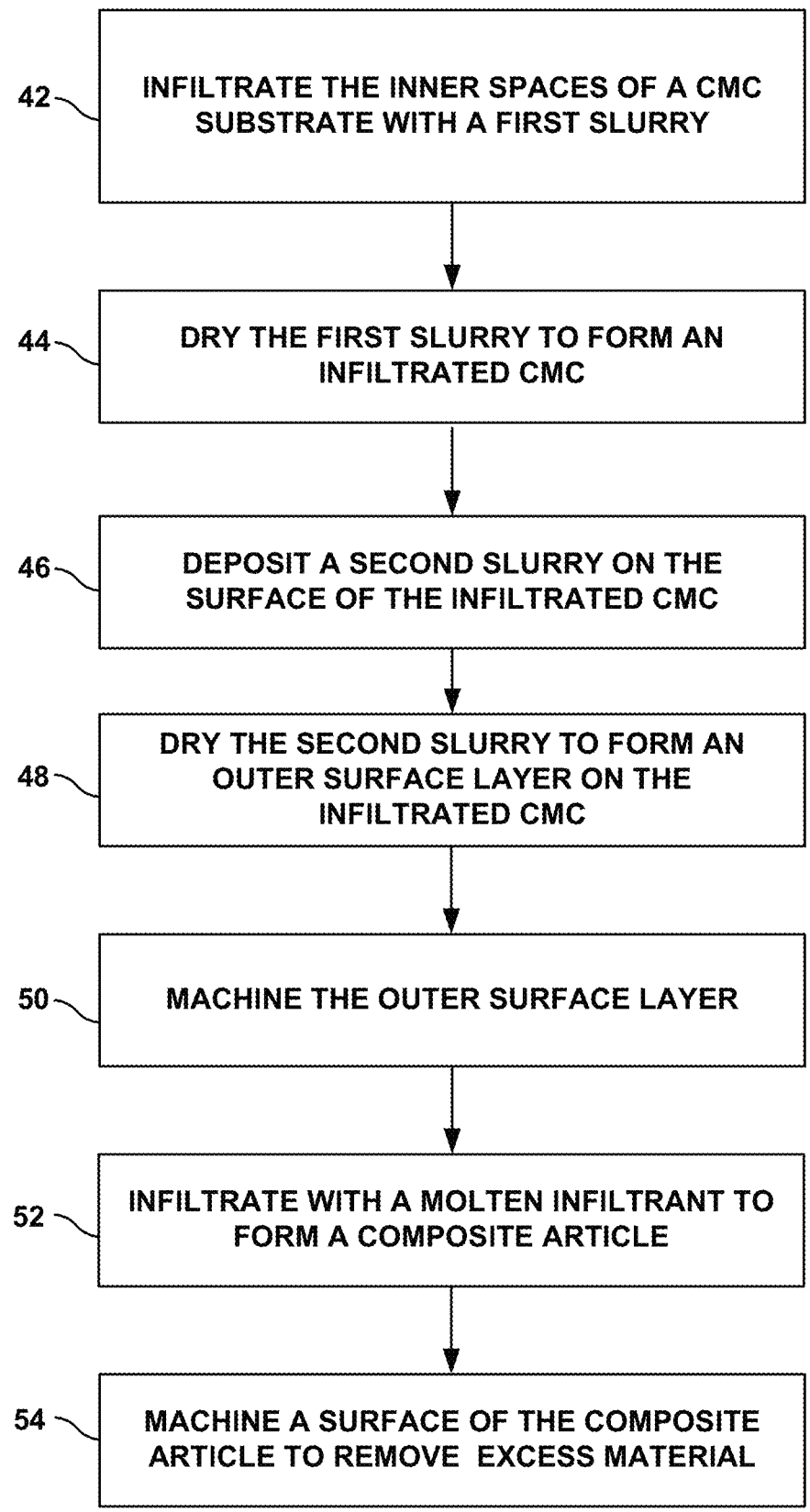
FIG. 4 is a flow diagram illustrating an example technique for forming an article including a ceramic matric composite (CMC) that includes a second surface layer formed from a second slurry.

The first and second slurries may be applied to CMC substrate 12 using any suitable technique. For example, FIG. 4 is a flow diagram illustrating an example technique for forming a composite article that includes a outer surface layer 17 formed from via the deposition and drying of a second slurry. While technique of FIG. 4 is described with concurrent reference to the conceptual diagram of FIGS. 1-3, in other examples, the technique of FIG. 4 may be used to form another article, or article 10 may be formed using a technique different than that described in FIG. 4.

The technique of FIG. 4 includes infiltrating a CMC substrate 12 with a first slurry including first solid particles 14 (42). CMC substrate 12 may be manufactured using one or more of the techniques discussed above. Additionally or alternatively, CMC substrate 12 may be acquired in prefabricated form. The first slurry may be applied to CMC substrate 12 using any suitable technique that allows first solid particles 14 to at least partially infiltrate the inner spaces 18 (e.g., pores) of CMC substrate 12. In some examples, the first slurry may be applied to CMC substrate 12 using a mold to assist with the infiltration process (42). In some such examples, CMC substrate 12 may be placed and sealed within the mold and subsequently injected with the first slurry including first solid particles 14 (42).

Once infiltrated, the first slurry may be dried (44) to remove the carrier material from the slurry, thereby leaving behind the solid materials of the first slurry (e.g. first solid particles 14) in inner spaces 18 of CMC substrate 12 and, in some examples, form a first surface layer (not shown) on CMC substrate 12. The drying process results in infiltrated CMC 13 (44). The drying may be conducted in any suitable manner, and in various examples, the infiltrated CMC 13 can be dried at room temperature under vacuum at about 1 Torr, or may be dried at ambient pressure at a temperature of up to about 150° C.

The technique of FIG. 4 also includes depositing a second slurry 28 that includes second solid particles 16 (e.g., a mixture of coarse and fine ceramic particles and diamond particles) on infiltrated CMC 13 (46). Second slurry 28 may be applied to the infiltrated CMC 13 (46) using any suitable technique. In some examples, second slurry 28 may be deposited on infiltrated CMC 13 using the same technique used to apply the first slurry.

Second slurry 28 may be subsequently dried to produce an outer surface layer 17 including the solid materials (e.g., solid particles 16) (48). The drying may be conducted in any suitable manner, and in various examples, second slurry 28 can be dried at room temperature under vacuum at about 1 Torr, or may be dried at ambient pressure at a temperature of up to about 150° C. In some examples, as second slurry 28 dries (48), the carrier material 36 of second slurry 28 may be wicked into the first solid particles 14 (e.g., inner spaces 18 and optional surface layer formed by the first slurry). The wicking effect may cause the solid materials of the second slurry (e.g., solid particles 16) to form outer surface layer 17 such that the layer defines a higher solid content percentage compared to the solid content percentage within inner spaces 18 formed by the first slurry having a similar composition. For example, the deposition and drying of the second slurry may result in a greater density of second solid particles 16 in the outer surface layer 17 compared to the density of first solid particles 14 in inner spaces 18 and/or an optional first surface layer formed by the first slurry, even though the first and second slurries are formulated to have substantially the same (e.g., the same or nearly the same) composition. In some examples, the wicking effect may help increase the solid content percentage of outer surface layer 17 compared to first solid particles 14 in inner spaces 18 by as much as 16%.

The technique of FIG. 4 also includes infiltrating article 10 with a molten infiltrant to form a composite CMC article (52). The molten infiltrant may include a molten metal or molten alloy infiltrant. The molten metal or molten alloy infiltrant may wick between particles of second solid particles 16 and between particles of first solid particles 14 of article 10 to occupy the interstices between the respective particles of first and second solid particles 14 and 16. In some examples, the melt infiltration process (52) may densify the resultant composite article to define an average porosity of less than about 5%, or less than about 3%, or less than about 1%.

In some examples, the molten metal or molten alloy infiltrant may include Si metal or Si metal alloy, B metal or B metal alloy, Al metal or Al metal alloy, Y metal or Y metal alloy, Ti metal or Ti metal alloy, Zr metal or Zi metal alloy, or the like. In some examples, the molten metal infiltrant includes Si metal or Si metal alloy (e.g., Si and BN powder). In some examples, the temperature for metal alloy infiltration such as Si metal infiltration is between about 1400° C. and about 1500° C. Under these conditions, the duration of the infiltration may be between about 15 minutes and about 4 hours, or between about 20 minutes and about 60 minutes. The melt infiltration process (52) may optionally be carried out under vacuum, but in other examples can be carried out in inert gas under atmospheric pressure to limit evaporation losses. In some examples, the mixture of coarse ceramic particles 30, fine ceramic particle 32, and diamond particles 34 of second solid particle 16 may help reduce of inhibit the formation of surface nodules (e.g., silicon nodules) on outer major surface 26 after the melt infiltration process.

The technique of FIG. 4 also includes the optional steps of machining outer major surface 26 of article 10 (50, 54). Outer major surface 26 may be machined (e.g., leveled) at least one of before or after the melt infiltration step (52). The machining of outer major surface 26 (50, 54) may be used to remove at least some of outer surface layer 17 including excess second solid particles 16 to define a contact surface for contacting another component (e.g., the one or more optional outer coating). The machining may include any type of mechanical machining, including, for example, milling, turning, shaping, planing, grinding, polishing, tumbling, grit blasting, or the like. The machining may remove at least some of the excess second solid particles 16 to reduce a dimension of the composite article and facilitate fit of the composite article with another component. Outer surface layer 17 including excess second solid particles 16 may reduce a chance that the machining exposes and/or damages reinforcement material 20 in the underlying CMC substrate 12. In some examples, the increased solid content percentage of outer surface layer 17 may decrease the susceptibility of outer surface layer 17 to cracking during the machining process (50, 52). In some examples, it may be desirable to machine outer major surface 26 prior to applying the molten infiltrant of step (50) as the molten infiltration step (52) may increase the density of outer surface layer 17, thereby hardening the layer and making the layer more difficult to subsequently machine.

In some examples, after the melt infiltration step (52), one or more optional outer coatings applied to the resultant composite article including, for example, a bond coat, an environmental barrier coating (EBC), an abradable coating layer, CMAS-resistant layer, or the like using one or more of the techniques discussed above.

EXAMPLES

Example 1

Figure 5:
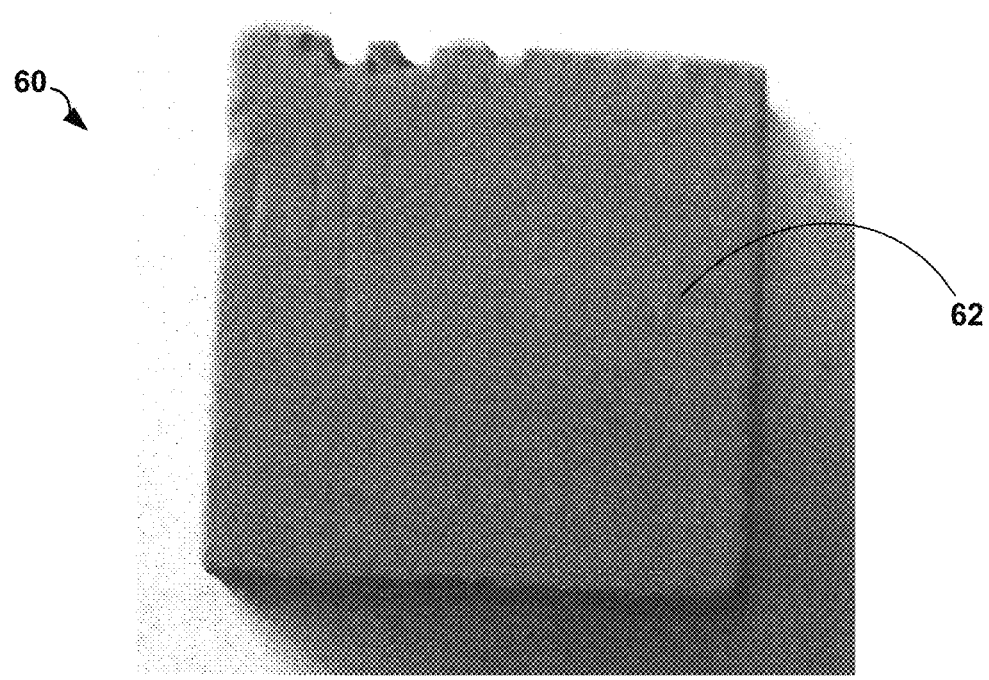
FIG. 5 is a photograph of an example article that includes an infiltrated CMC having a second surface layer formed from a second slurry.

FIG. 5 is a photograph of an example article 60 including a CMC substrate having an outer surface layer including a second ceramic material. Article 60 was formed by initially infiltrating the CMC substrate with a first slurry mixture and subsequently drying the first slurry to form an infiltrated CMC substrate. The CMC substrate of article 60 included a SiC fiber based preform. The first slurry mixture used to infiltrate article 60 included SiC particles mixed in a solvent with graphite and a surfactant. The first slurry was applied to the CMC substrate via vacuum assisted infiltration. After infiltration of the the first slurry, the slurry was allowed to dry overnight at room temperature followed by oven drying at approximately 150° C. for approximately 2 hours. The drying of the first slurry infiltrated the SiC fiber preform with SiC particles from the first slurry. Testing showed the first slurry defined a solid content percentage of SiC particles within the fiber preform of approximately 30% by volume. A second slurry made of SiC (3-part blend of differently sized particles ranging from fine to coarse) and graphite mixed in a solvent was then applied to the surface of the infiltrated CMC substrate via a dip coating process and subsequently dried overnight at room temperature followed by drying in an oven at approximately 150° C. for approximately 2 hours. Drying the second slurry formed an outer surface layer 62 made of SiC particles from the second slurry. Subsequent testing showed the outer surface layer defined a solid content percentage of approximately 5% greater than solid content percentage formed within the fiber preform via the deposition and drying of the first slurry.

Figure 6:
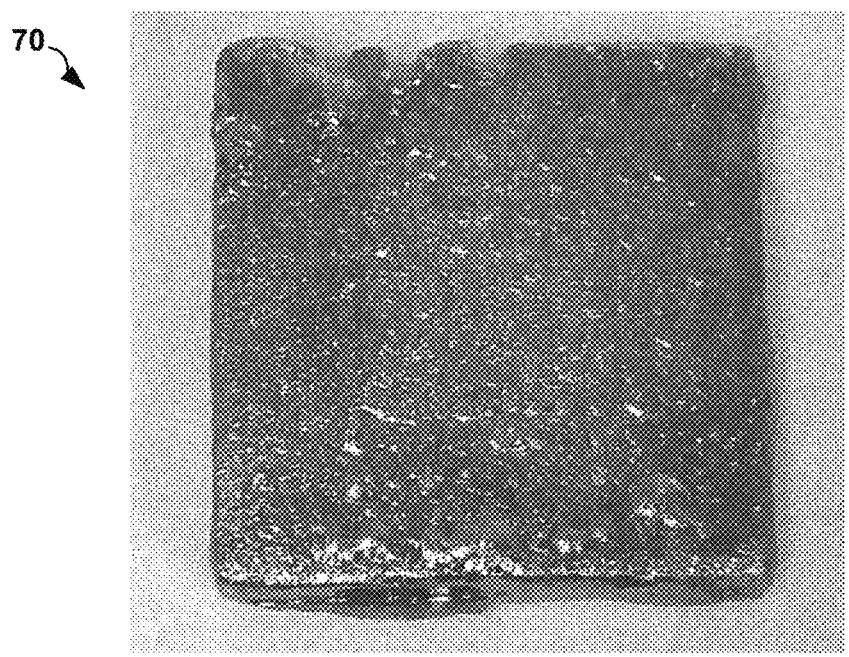
FIG. 6 is a photograph of the article of FIG. 4 after being subjected to a subsequent melt infiltration process.

FIG. 6 shows a photograph of a composite article 70 formed via subjecting article 60 to a subsequent melt infiltration cycle to further densify the CMC substrate.

Example 2

Figure 7:
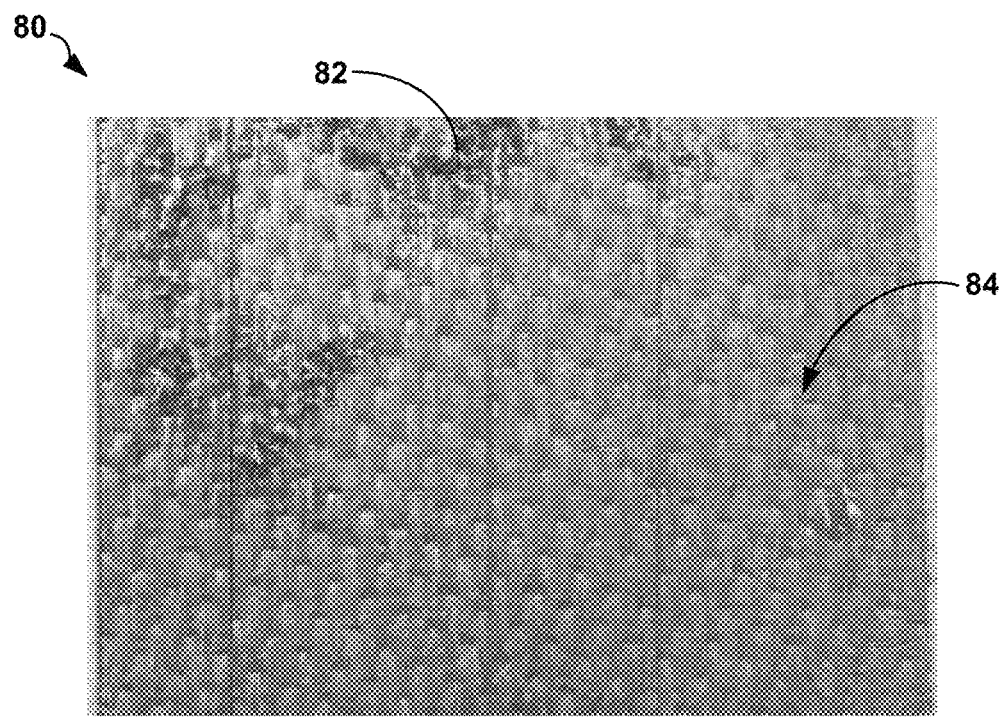
FIG. 7 is a photograph of a comparative example CMC article of a porous preform that had been initially infiltrated with a slurry, dried, and subsequently infiltrated with molten silicon alloy.

FIG. 7 is a photograph of a comparative example CMC article 80 including a porous preform that had been initially infiltrated with a slurry, dried, and subsequently infiltrated with molten silicon alloy. The porous preform of article 80 included a SiC fiber based preform. The slurry applied to article 80 included a plurality of coarse ceramic particles, a plurality of fine ceramic particles, and diamond particles. The coarse ceramic particles applied to article 80 defined an average coarse particle diameter of 16 μm and accounted for about 75 vol. % of the solid materials of the slurry mixture. The fine ceramic particles applied to article 80 defined an average fine particle diameter of 3 μm and accounted for about 23 vol. % of the solid materials of the slurry mixture. The diamond particles applied to article 80 defined an average particle diameter of 2.5 μm and accounted for 2 vol. % of the solid materials of the slurry mixture. The molten metal infiltrant applied to article 80 included a silicon alloy (including about 96 wt. % to about 99.5 wt. % of Si). As shown in FIG. 7, article 80 includes several silicon nodules 82 the formed on the exterior surface 84 of article 80 as a result of the melt infiltration process.

Figure 8:
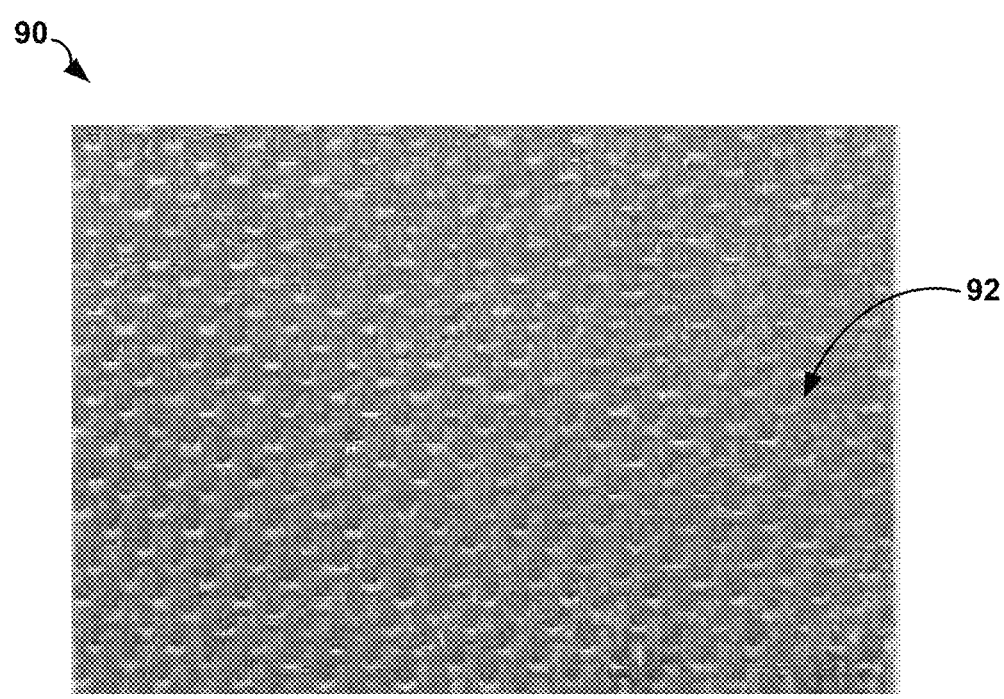
FIG. 8 is a photograph of an example CMC article of a porous preform that had been initially infiltrated with a slurry, dried, and subsequently infiltrated with molten silicon alloy.

FIG. 8 is a photograph of an example CMC article 90 including a porous preform that had been initially infiltrated with a slurry, dried, and subsequently infiltrated with molten silicon alloy. The porous preform of article 90 included a SiC fiber based preform. The slurry applied to article 90 included a plurality of coarse ceramic particles, a plurality of fine ceramic particles, and diamond particle. The coarse ceramic particles applied to article 90 defined an average coarse particle diameter of 16 μm and accounted for 50 vol. % of the solid materials of the slurry mixture. The fine ceramic particles applied to article 90 defined an average fine particle diameter of 3 μm and accounted for 48 vol. % of the solid materials of the slurry mixture. The diamond particles applied to article 90 defined an average diamond particle diameter of 2.5 μm and accounted for 2 vol. % of the solid materials of the slurry mixture. The molten metal infiltrant applied to article 90 included a silicon alloy (including about 96 wt. % to about 99.5 wt. % of Si). As shown in FIG. 8, the presence of silicon nodules 82 on the exterior surface 92 of article 90 has been substantially reduced compared to article 80.

Various examples have been described. These and other examples are within the scope of the following claims.

What is claimed is:

1. A method comprising:
    infiltrating a ceramic matrix composite (CMC) substrate with a first slurry, wherein the CMC substrate comprises a reinforcement material defining a plurality of pores and the first slurry at least partially fills some of the pores of the CMC substrate, and wherein the first slurry comprises a carrier material and first solid particles comprising a first ceramic material;
    drying the first slurry to form an infiltrated CMC comprising the first solid particles;
    depositing a second slurry comprising a carrier material and second solid particles on an outer surface of the infiltrated CMC, wherein the second solid particles comprise a plurality of fine ceramic particles defining a fine particle average size, a plurality of coarse ceramic particles defining a coarse particle average size, and a plurality of diamond particles, wherein the fine particle average size is less than the coarse particle average size;
    drying the second slurry to form an article having an outer surface layer on the outer surface of the infiltrated CMC, the outer surface layer comprising the second solid particles, wherein the first solid particles define a first solid content percent within the pores of the CMC substrate, and wherein the outer surface layer defines a second solid content percent greater than the first solid content percent; and
    infiltrating the article with a molten infiltrant to form a composite article.

2. The method of claim 1, wherein drying the second slurry comprises wicking the carrier material of the second slurry into at least some of the pores of the CMC substrate.

3. The method of claim 1, wherein a composition of the first slurry is different than a composition of the second slurry.

4. The method of claim 1, wherein a composition of the first slurry is same as a composition of the second slurry.

5. The method of claim 1, wherein at least one of the first ceramic material, the plurality of coarse ceramic particles, or the plurality of fine ceramic particles comprise at least one of boron carbide, silicon carbide, silicon nitride, or molybdenum carbide.

6. The method of claim 1, wherein the second slurry comprises about 40 percent by volume (vol. %) to about 70 vol. % of the second solid particles.

7. The method of claim 1, wherein the second solid particles comprise between about 1 percent by volume (vol. %) and about 10 vol. % of the plurality of diamond particles.

8. The method of claim 1, wherein the second solid particles comprise between about 40 percent by volume (vol. %) and about 50 vol. % of the plurality of coarse ceramic particles, and comprise between about 40 percent by volume (vol. %) and about 59 vol. % of the plurality of fine ceramic particles.

9. The method of claim 1, wherein drying the second slurry comprises using a mold to define the outer surface layer.

10. The method of claim 1, wherein the molten infiltrant comprises silicon.

11. The method of claim 1, wherein the second slurry defines a viscosity of less than about 1000 centipoise.

12. The method of claim 1, further comprising mechanically smoothing the second slurry after depositing the second slurry and before the second slurry has dried.

13. The method of claim 1, wherein drying the first slurry forms a first surface layer comprising the first solid particles on the CMC substrate.

14. The method of claim 1, wherein a surface finish of the outer surface layer on the outer surface of the infiltrated CMC is smoother than a surface finish of the outer surface of the infiltrated CMC prior to deposition of the second slurry.

* * * * *